April 16, 1940.  H. W. CARNES  2,197,144
AUTOMATIC CHANGEOVER VALVE
Filed July 31, 1937  3 Sheets-Sheet 1
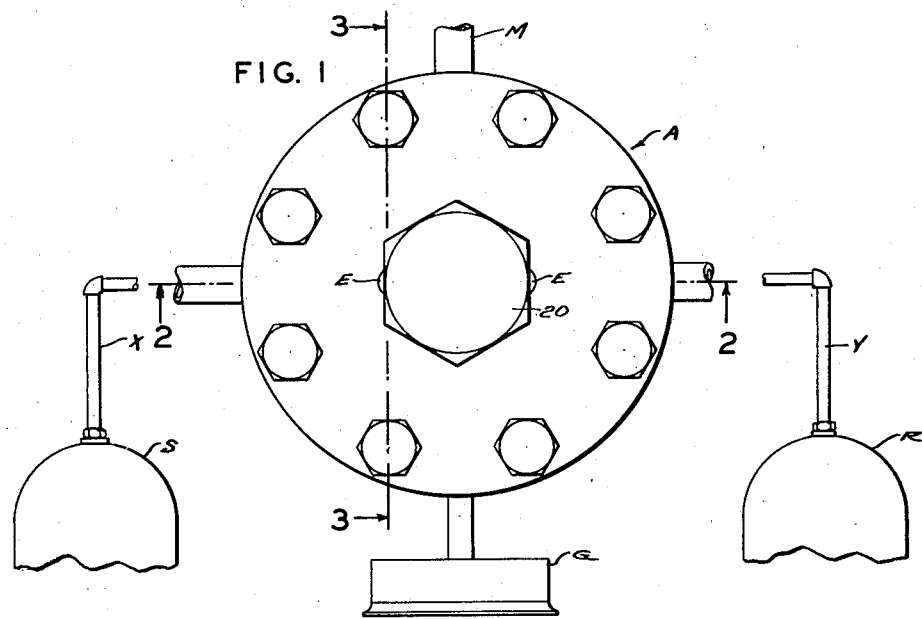
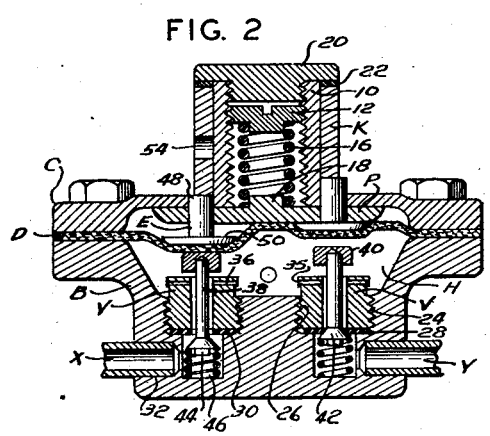
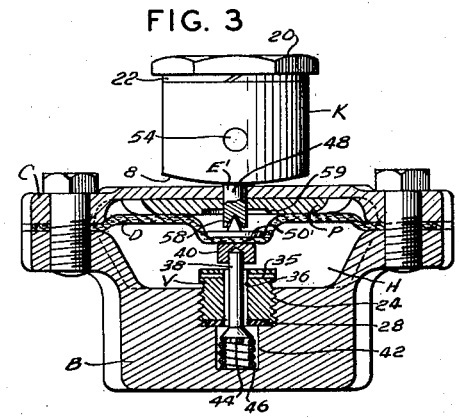
INVENTOR.
HERMAN W. CARNES
BY
ATTORNEY April 16, 1940.   H. W. CARNES   2,197,144
AUTOMATIC CHANGEOVER VALVE
Filed July 31, 1937   3 Sheets-Sheet 2

INVENTOR.
HERMAN W. CARNES
BY
ATTORNEY

April 16, 1940.  H. W. CARNES  2,197,144
AUTOMATIC CHANGEOVER VALVE
Filed July 31, 1937  3 Sheets-Sheet 3

INVENTOR.
HERMAN W. CARNES
BY
ATTORNEY

Patented Apr. 16, 1940

2,197,144

UNITED STATES PATENT OFFICE

2,197,144

AUTOMATIC CHANGE-OVER VALVE

Herman W. Carnes, Indianapolis, Ind., assignor to Carbide and Carbon Chemicals Corporation, a corporation of New York Application July 31, 1937, Serial No. 156,691

19 Claims. (Cl. 221—73.5)

This invention relates to fluid control mechanism for supplying a fluid from any one of a plurality of branch conduits to a main conduit, and more particularly to an improved automatic control valve to insure continuity of the supply of fluid to the main conduit.

In isolated gas supply systems, gas for domestic use is supplied from cylinders or containers in which the gas is stored either in a liquid or gaseous state under relatively high pressure. It is considered good practice, in such installations, to have at all times two cylinders of stored gas connected to the supply system; one of these cylinders being the service cylinder and the other cylinder being the reserve cylinder. Gas is withdrawn from only one cylinder at a time, and when such service cylinder has been emptied, or the pressure therein has dropped to a point at which the gas will not be forced through the supply conduit, the valve controlling the other or reserve cylinder, is opened and the main conduit is then supplied from the gas contained in such reserve cylinder. Mechanism is provided for changing the system connections so that gas may be supplied from either of the two cylinders as desired or as necessary.

The gas supply cylinders and the control mechanism are usually located at some distance from the consumption apparatus, which makes it inconvenient or difficult to maintain a close check on the condition of the service cylinder and to change the connections at the right time, because manually operated valves have heretofore been employed for changing over the supply of gas from the service cylinder to the reserve cylinder.

The principal object of this invention is to overcome the bother of constantly checking the condition of the gas supply and of manually changing over from the service to the reserve cylinder at exactly the right time. Other objects are to provide a simple, reliable, inexpensive and novel automatic control valve for switching the supply of gas from the service cylinder to the reserve cylinder, and to provide suitable means for indicating to the consumer that the supply of gas in the service cylinder has been exhausted and that the system is operating from the reserve cylinder.

These and other objects, and the novel features of the invention, will become apparent from the following description when considered in connection with the accompanying drawings, in which:

Fig. 1 is a plan view of an improved control valve embodying this invention, and diagrammatically showing the essential elements of the gas supply system in which it is adapted to be used;

Fig. 2 is a sectional view of the control valve, taken on the line 2—2 of Fig. 1;

Fig. 3 is another sectional view of the control valve, taken on the line 3—3 of Fig. 1, showing a slight modification;

Figure 4:
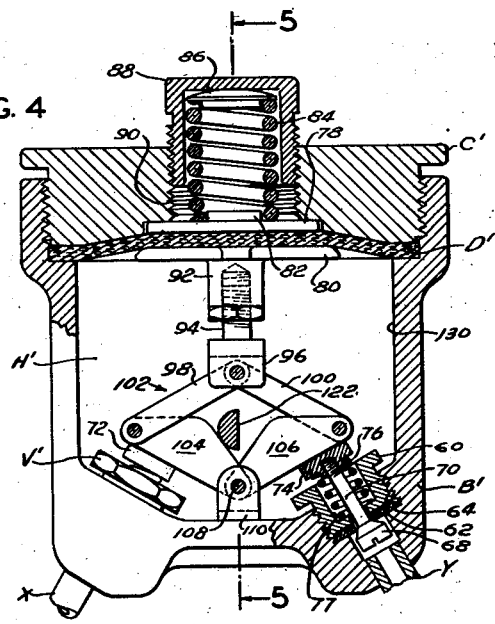
Fig. 4 is a view, mainly in section on the line 4—4 of Fig. 5, showing another control valve embodying the invention.

Generally speaking, the fluid control mechanism of the present invention comprises a casing having a pair of inlets, each connected to a cylinder or other container containing gas under relatively high pressure, and an outlet connected to gas consuming appliances. A pair of automatically normally closed valves mounted in the casing severally control the flow of fluid through each inlet, and either valve may be selectively locked in open position by mechanism including a single pressure responsive means, operable automatically upon a predetermined drop in the pressure within the casing, to subsequently open the other valve.

Referring particularly to Figs. 1, 2, and 3, one form of the improved fluid control mechanism embodying the invention comprises a valve A having a casing provided with fluid inlets connected by conduits X and Y, respectively, to a service cylinder S and a reserve cylinder R. Also connected to the valve A is a pressure indicating gauge G, and the valve is formed with a fluid outlet connected to a supply main M which leads through a suitable pressure regulator (not shown) to the usual gas consuming devices.

The valve A comprises a body B and a cap C between which is secured a flexible diaphragm D. A pair of valve assemblies V are mounted in the body B and at times may be engaged by portions of the diaphragm D which are depressed by valve operating elements E engaged by a suitable valve operating device such as a rotatable cylindrical cam K. The cap C has a tubular extension or housing 10 which is internally threaded to receive an adjusting nut 12; and a spring 16 bears against the nut 12 and against a spring seat 18 on a diaphragm backing plate P. Adjustment of the nut 12 varies the operating pressure of the valve. A threaded cap or closure 20 is secured to the extension 10 to protect the nut 12.

The cam K is in the form of a sleeve surrounding and rotatably engaging the tubular extension 10. The cam K has a diagonal inner end forming a cam surface 8 which cooperates with one or the other of the valve operating elements E to depress either of the latter. The other end of the cam K bears against a flange on the threaded cap 20; and a spring washer 22 between the cam and the cap retains the cam in its adjusted position. A recess 54 in the cam K is adapted to receive the lug on a suitable tool such as a spanner wrench for turning the cam.

Each valve assembly V comprises a valve seat retainer 24 threaded into a bore 26 in the body B and engaging a gasket or seat 28 seated on a shoulder 30 formed in the bore. A second bore 32 opens into the bore 26 and receives the end of the conduit X leading to the service cylinder S or the conduit Y leading to the reserve cylinder R. The upper end of valve seat retainer 24 extends into body B and is formed with a plurality of radial bores 35 communicating with a valve chamber H and a central bore 36, in which is loosely mounted a valve stem 38 forming part of an automatically normally closed valve controlling the flow of fluid through the inlet bore 32. On the upper end of valve stem 38 is set a bearing member 40, and the lower end of stem 38 is formed with a valve head 42 and a spring seat 44 which engages a spring 46 mounted in the bore 26. Each valve operating element E comprises a stem 48, coaxially aligned with a valve stem 38, and a head 50, the head being provided with a rounded edge for engaging the diaphragm D.

The operation of this form of control valve may be best understood by reference to Fig. 2. The threaded cap 20 is removed and the adjusting nut 12 is turned to set the valve for the desired operating pressure at which the gas supply will be switched from the service cylinder S to the reserve cylinder R. This pressure is usually from 15 to 20 pounds per square inch. The threaded cap is then replaced to protect the adjusting nut, and the cam K is turned so that the lower edge of the surface 8 depresses the valve operating element E associated with the valve assembly V controlling the admission of gas to the valve chamber H from the service cylinder. Depression of this member moves the cooperating valve stem 38 and valve head 42 downwardly, compressing the associated spring 46, and thereby gas is admitted from the cylinder S at full pressure to the chamber H, from which it may pass into the supply main M. At the same time gas passes from the chamber H to the indicating gauge G, which registers the gas pressure in the service cylinder S. The element E associated with the valve assembly V controlling the supply of gas from the service cylinder S is positively locked in a downward position at all times by means of the cam K. The gas pressure in the chamber H forces the diaphragm D upwardly, compressing the spring 16 and thereby the valve assembly V associated with the reserve cylinder R may be maintained in a closed position by spring 46. When pressure within the service cylinder drops below that for which the valve A has previously been set, the spring 16 forces the diaphragm D downwardly into engagement with the bearing member 40 on the right hand valve stem 38 and opens this valve assembly a slight amount. Gas from the reserve cylinder then enters the chamber H and passes from there to the consuming apparatus and to the gauge G. The gauge G then indicates the operating pressure for which the valve is set, which is from 15 to 20 pounds per square inch; and the diaphragm D, spring 16 and adjusting nut 12 now control the admission of gas. The valve on the reserve cylinder is under the control of spring 16 and diaphragm D. It thus acts as a pressure regulating valve, closing whenever the pressure in chamber H equals the predetermined pressure and opening when the pressure in chamber H drops below the predetermined value. When the consumer notices the drop in the gauge pressure, he orders a full cylinder of gas. To remove the empty cylinder and couple a full one in its place, the cam K is turned 180° to thereby lock the right hand valve operating element E in its downward position, permitting the reserve cylinder to supply gas at full pressure to the system, and allow the left hand element E to be moved to an upward position, through valve stem 38 and expansion of spring 46, closing off the supply of gas from the substantially empty service cylinder. The cylinder S is then disconnected and the full cylinder is connected in its place. The former reserve cylinder R now becomes the service cylinder, the full cylinder becomes the reserve cylinder, and operation proceeds to supply gas continuously to the consuming devices, as heretofore described. As soon as the right hand element E has been moved downwardly by the rotation of the cam K, the spring 16 will have no more effect on the position of the right hand valve assembly and thereby the gas pressure in the former reserve cylinder R, which is now the service cylinder, will be maintained in the chamber H, and the gauge G will register this pressure.

The stem 48 sometimes does not freely slide through the plate P and the cap C; and, to overcome this difficulty, the valve operating element E' shown in Fig. 3 may be substituted. In this instance, the stem 48 is a separate piece from the head 50' and is formed with a conical recess 58 which is engaged by a conical projection on the head. The plate P is formed with a recess 59 to receive the head 50'. With this construction, only the head 50' moves with the plate P and diaphragm D, and the stem 48 is only moved when the cam K is set. Thus, there are two independent self-centering parts, and movement of the diaphragm D will not be impeded by binding of the stem 48 in moving through the cap C.

Figure 5:
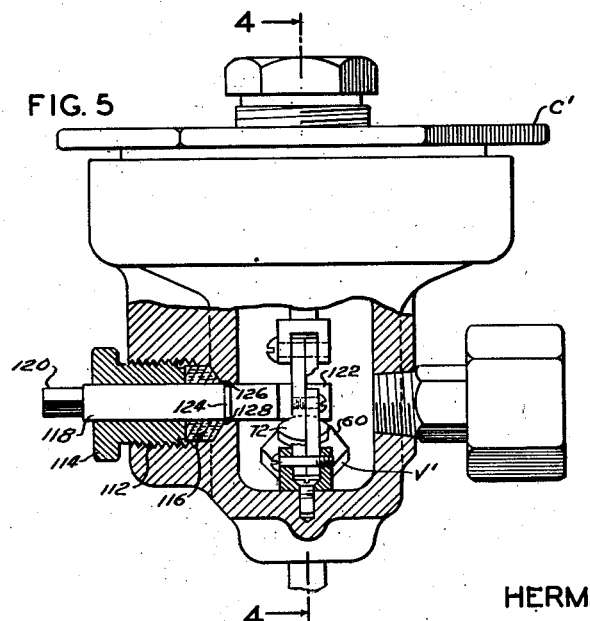
Fig. 5 is a side view of the valve shown in Fig. 4, illustrating parts in section on the line 5—5 of Fig. 4.

The form of control valve shown in Figs. 4 and 5 comprises a body B', a cap C', and a flexible diaphragm D' clamped between the body and cap. A valve assembly V' is provided to control the passage of gas from each cylinder into the chamber H' and to the service main. Each valve assembly V' comprises a valve seat retainer 60 threaded into a bore 62 in the body B' and seating against a seat or gasket 64 which engages a shoulder formed in the bore. Conduits X and Y leading to the service cylinder and the reserve cylinder, respectively, are each secured in the outer end of one of the bores 62. The valve head 68 engages the valve seat 64; and an abutment 72, secured to the inner end of the valve stem 70, is formed with a flange 74 which engages a spring 76 secured between the same and the bottom of a recess 77 in the valve seat retainer for normally holding the head 68 in engagement with the valve seat 64.

Upper and lower plates 78 and 80, respectively, are held in contact with the diaphragm D'. The upper plate 78 has a spring seat 82 engaged by a spring 84 which engages a second seat 86 mounted in an adjusting member 88 threaded into an aperture 90 formed in the valve cap C'. To lower plate 80 is secured a bushing 92 threadedly receiving a forked adjusting screw 94 to which are pivotally connected arms 98 and 100 forming part of a four-bar linkage 102. Valve operating elements such as cam-shaped bars 104 and 106 are each pivotally secured at one end to arms 98 and 100, respectively, at the outer ends of these arms. Bars 104 and 106 are pivotally connected at their opposite ends by a pivot 108 mounted in a U-shaped member 110 secured to the body B'.

A bore 112, formed in the side wall of the body B', threadedly receives a packing nut 114 engaging a packing or gasket 116 mounted between the inner end of the bushing and a shoulder formed in the bore. Rotatably mounted in the bushing 114 is a valve operating member such as a shaft 118 formed at its outer end with a square portion 120 for receiving a wrench, or other suitable adjusting tool, and at its inner end with a semi-cylindrical cam portion 122. A groove 124 in the shaft receives a snap ring 126 which engages a similar groove 128 formed in the walls of the bore 112. This snap ring holds the shaft 118 assembled to the body B'. As in the modification first described, other conduits lead from the chamber H' to the consumption apparatus and to an indicating gauge.

The operation of the valve mechanism shown in Figs. 4 and 5 is as follows: The adjusting member 88 is threaded into the cap C' an amount sufficient to compress the spring 84 the desired amount to predetermine the pressure at which the valve controlling the flow of gas from the reserve cylinder to the chamber H' will open. The shaft 118 is then rotated to move the cam portion 122 into engagement with the bar 104, depressing this bar, which opens the valve assembly V' controlling the conduit X leading to the service cylinder, and positively locks this valve assembly in open position. When the supply of gas in the service cylinder has become exhausted, the pressure in the chamber H' of the body B' will have dropped and spring 84 will have forced the diaphragm D' downwardly, carrying with it the bushing 92 and the adjusting screw 94 which, through movement of the arms 98 and 100 and the cam-shaped bar 106, will have depressed the valve assembly V' controlling the conduit Y leading to the reserve cylinder. Through the action of the diaphragm D' on the valve controlling the reserve cylinder, the pressure within the chamber H' will be maintained at substantially that value which has been predetermined by movement of the adjusting member 88, and the gauge G will register this reduced pressure, thereby notifying the consumer that a new cylinder must be ordered. When the new cylinder arrives, the shaft 118 is turned 180° to depress the bar 106 and hold open the valve assembly V' controlling the conduit Y leading to the reserve cylinder. Release of cam 104 permits the valve assembly controlling the conduit x to close. The empty service cylinder is then disconnected and the full cylinder connected in its place. The reserve cylinder then becomes a service cylinder and the new cylinder becomes a reserve cylinder. As soon as the valve assembly V' controlling the conduit Y is set in open position, full cylinder pressure is maintained in the chamber H' and the gauge G then registers this full cylinder pressure.

Figure 6:
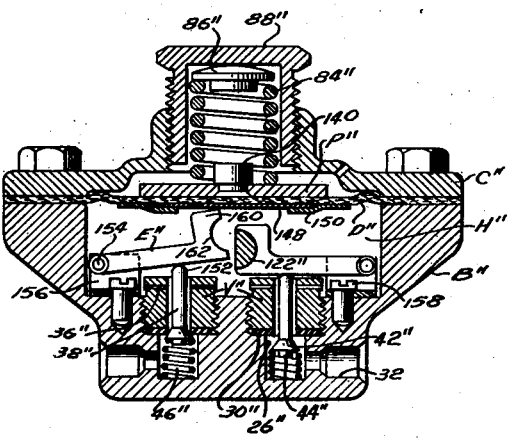
Fig. 6 is a sectional view, taken on the line 6—6 of Fig. 8, showing another form of control valve embodying the invention.
Figure 7:
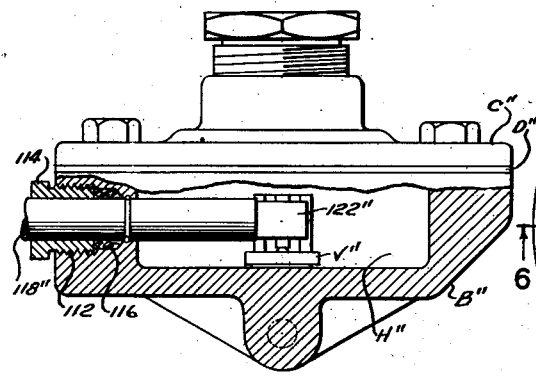
Fig. 7 is a side view of the valve shown in Fig. 6, illustrating parts in section on the line 7—7 of Fig. 8.
Figure 8:
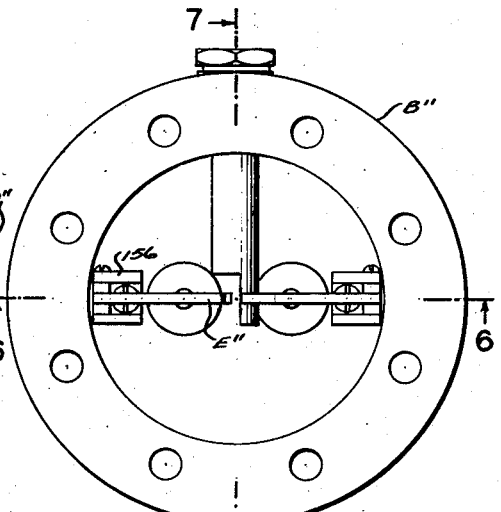
Fig. 8 is a plan view of the lower portion of the valve shown in Fig. 6.

In the valve mechanism shown in Figs. 6, 7, and 8, a diaphragm D" is clamped between a body B" and a cap C", and is provided with a backing plate P" to which is secured a spring seat 140. A spring 84" engages the plate P" and a spring seat 86" mounted in an adjusting member 88" identical with the adjusting member 88 of the form of valve shown in Figs. 4 and 5. A bearing plate 148 is secured to the lower side of the diaphragm D" by means of a cemented rubber strip 150.

The two valve assemblies V" of this modification are substantially identical in construction with the valve assemblies V of the valve disclosed in Figs. 1, 2, and 3, and like numerals double-primed have been used to designate corresponding parts. Each of the members E" is pivoted at 154 to a bracket 156 secured to the body B" adjacent the cooperating valve assembly V" by means of screws 158. At its opposite end, each member E" is provided with a right angle portion 160 in which is formed a semi-circular recess 162, so that, when the members E" are both in the lower position, the two recesses cooperate to form a circular recess. The operating shaft 118" used in this modification is identical in construction with the shaft 118 of the modification disclosed in Figs. 4 and 5, and the cam portion 122" may engage the recess 162 in either of the elements E". As the operation of this form of control valve is identical with that previously described in connection with the other forms of the control valve, further description of the operation is not believed necessary at this point.

In each of the valve mechanisms described above, the rotatable cam or operating shaft may be provided with some form of indicating means in order to show which of the two cylinders is being used as the service cylinder. This indicating means may take the form of a pointer secured to the operating shaft 118 or 118", whereas an indicating arrow or the spanner wrench recess 54 on the rotatable cam K of the modification shown in Figs. 1, 2, and 3, may be used to indicate the service cylinder in use with this form of the control valve.

The above described automatic control valve insures that a constant supply of gas will be provided for the gas consuming apparatus and that an immediate and easily discernible indication will be given when the supply of gas in one cylinder has become exhausted. Furthermore, each of the described forms of the control valve is easily adjustable to any desired operating pressure at which flexure of the diaphragm will take place to open the control valve for the reserve cylinder. The valves described are easily disassembled, and ready access may be had to any operating part thereof for repair or replacement. The valves are furthermore rugged in design and comprise few parts which are liable to become damaged or to easily get out of order. The various constructions are inexpensive to manufacture and may be used in place of the present non-automatic control valves at only a slight additional cost.

It will be noted that in each of the described constructions, a single adjustable pressure responsive means controls both valves.

Although several embodiments of the invention are disclosed in detail, it will be evident that numerous changes may be made in such details without departing from the principles of the invention.

What is claimed is:

1. A valve mechanism comprising a casing providing a chamber having an outlet and two inlets; two automatically closing valves, one associated with each inlet, controlling the flow of fluid through said inlets into said chamber; mechanism selectively operable to positively lock either of said valves in the open position to admit fluid into said chamber; and a single pressure responsive means operatively associated with both of said valves and operable automatically upon a predetermined drop of the fluid pressure in said chamber to open the other of said valves.

2. A valve mechanism as claimed in claim 1, in which such selectively operable mechanism includes means operable after such drop of pressure, to first release the valve opened by such selectively operable means and permit such valve to close, and then to positively lock said other valve in the open position.

3. A gas supply system comprising, in combination, a gas supply main; a service cylinder containing gas under pressure; a reserve cylinder containing gas under pressure; and means for controlling the flow of gas from said cylinders to said main, such means comprising a chamber communicating directly with said main and adapted to communicate with said cylinders; a pair of valves severally controlling the flow of gas from said cylinders into said chamber; a device for positively locking one of said valves in the open position to permit said gas to flow only from said service cylinder into said chamber; and a single automatically operating means operatively associated with both of said valves for subsequently opening the other valve to permit gas to flow from said reserve cylinder into said chamber when the gas pressure in said chamber and said service cylinder has dropped to a predetermined pressure.

4. A gas supply system as claimed in claim 3, including means for closing said valves automatically, and means on said device operable to permit the first-opened valve to close and shut off communication between said chamber and said service cylinder, so that the latter may be removed and a full cylinder substituted therefor while maintaining communication between said reserve cylinder and said chamber.

5. A valve mechanism comprising a casing having a plurality of inlet openings and at least one outlet opening; a valve controlling the flow of fluid through each inlet opening; means normally retaining each of said valves in closed position; means for selectively and positively locking one of said valves in the open position; and a single pressure responsive means operatively associated with all of said valves for at times opening another of said valves.

6. A valve mechanism comprising a casing having a chamber provided with a plurality of inlet openings and at least one outlet opening; a valve controlling the flow of fluid through each inlet opening into said chamber; means normally retaining each of such valves in closed position; means for selectively and positively locking one of said valves in the open position; and a single pressure responsive means operatively associated with all of said valves and responsive to a predetermined fluid pressure in said chamber for opening another of said valves.

7. A valve mechanism comprising a casing having a plurality of inlet openings and at least one outlet opening; a valve controlling the flow of fluid through each inlet opening; means normally retaining each of said valves in closed position; means for selectively and positively locking one of said valves in the open position; pressure responsive means for at times opening another of said valves; and a single means operatively associated with all of said valves for adjusting the pressure at which said pressure responsive means opens said other valve.

8. A valve mechanism comprising a casing having a plurality of inlet openings and at least one outlet opening; a valve controlling the flow of fluid through each inlet opening; means normally retaining each of said valves in closed position; means, including a cam adapted to operate each valve, for selectively opening one of said valves; and a single pressure responsive means operatively associated with all of said valves for at times opening another of said valves.

9. A valve mechanism comprising a casing having a pair of inlet openings and an outlet opening; a valve controlling the flow of fluid through each inlet opening; means normally retaining each of said valves in closed position; means, including a single rotatable cam, for selectively opening either one of said valves; a single pressure responsive means operatively associated with both of said valves for at times opening the other of said valves; and means for indicating when said other valve has been opened by said pressure responsive means.

10. A valve mechanism comprising a casing having a plurality of inlet openings and at least one outlet opening; a valve controlling the flow of fluid through each inlet opening; means normally retaining each of said valves in closed position; means, including an element engaging each valve and a cam for engaging said elements, for selectively opening one of said valves; pressure responsive means for at times opening another of said valves; and a single means operatively associated with all of said valves for adjusting the pressure at which said pressure responsive means opens said other valve.

11. A valve mechanism comprising a casing having a plurality of inlet openings and at least one outlet opening; a normally closed valve controlling the flow of fluid through each inlet opening; a cap secured to said casing; a flexible diaphragm secured between said casing and cap; a valve operating element coaxially aligned with each valve and slidably mounted in said cap; and means rotatably mounted on a portion of said cap for selectively engaging one of such valve operating elements to depress the same and thereby cause said element to force a portion of said flexible diaphragm into engagement with the associated valve to open the same.

12. A valve mechanism comprising a casing having a plurality of inlet openings and at least one outlet opening; a valve controlling the flow of fluid through each inlet opening; a cap secured to said casing; a flexible diaphragm secured between said casing and cap; a diaphragm backing plate engaging the upper side of said diaphragm; means for resiliently urging said backing plate and diaphragm to a downward position; a valve operating element coaxially aligned with each valve; such valve operating elements each including a stem extending through said backing plate and casing and a separable head engaging the upper side of said diaphragm; and means rotatably engaging a portion of said cap for selectively depressing one of said valve operating elements.

13. A valve mechanism comprising a casing having a plurality of inlet openings and at least one outlet opening; a normally closed valve controlling the flow of fluid through each inlet opening; means for selectively opening one of such valves; pressure responsive means for at times opening another of such valves; said first-named means including a 4-bar linkage pivotally connected to said casing and to said pressure responsive means, and a member extending through said casing and adapted to selectively engage elements of said 4-bar linkage.

14. A valve mechanism comprising a casing having a plurality of inlet openings and at least one outlet opening; a normally closed valve controlling the flow of fluid through each inlet opening; means for selectively opening one of such valves; pressure responsive means for at times opening another of such valves; a valve operating element associated with each of said valves, each of said elements being pivotally connected at one end to a single point on said casing; an arm pivotally connected to the opposite end of each valve element, the opposite ends of said arms being pivotally connected to a single point on said pressure responsive means; said first-named means including a member extending through said casing and adapted to selectively engage one of said valve operating elements to open the associated valve.

15. A valve mechanism comprising a casing having a plurality of inlet openings and at least one outlet opening; a normally closed valve controlling the flow of fluid through each inlet opening; means for selectively opening one of such valves; pressure responsive means for at times opening another of such valves; valve operating elements each pivoted to said casing and engaging one of said valves; said first-named means including a member extending through said casing and adapted to selectively depress one of said valve-operating elements.

16. A valve mechanism comprising a casing having a plurality of inlet openings and at least one outlet opening; a valve controlling the flow of fluid through each inlet opening; means normally retaining each of such valves in closed position; means for selectively opening one of such valves; pressure responsive means for at times opening another of such valves; and valve operating elements each pivotally connected to the casing and associated with one of said valves; said second-named means comprising a rotatable shaft extending transversely through said casing and having a cammed end for selectively engaging one of said valve operating elements to depress the same and open the associated valve.

17. A valve mechanism comprising a casing having a plurality of inlet openings and an outlet opening; a valve controlling the flow of fluid through each inlet opening; a cap secured to said casing; a diaphragm secured between said cap and said casing; resilient means for urging said diaphragm to a downward position; arms pivoted to said casing and each adapted to engage one of said valves; and a rotatable shaft extending transversely through said casing and adapted to selectively engage the end of one of said valve operating elements to depress the same.

18. A fluid control mechanism comprising, in combination, a casing having a chamber provided with a fluid outlet and two fluid inlets; two valves, one operatively associated with each of said inlets, said valves severally normally preventing the flow of fluid through said inlets into said chamber; means for selectively opening and holding open either of said valves without operatively affecting the other of said valves; and pressure responsive means common to both of said valves, and operable automatically when the pressure in said chamber attains a predetermined value, to open the other of said valves while the previously opened valve remains open.

19. A valve mechanism comprising a casing having a plurality of inlet openings and at least one outlet opening; a cap secured to said casing; a flexible diaphragm secured between said casing and cap; a diaphragm backing plate engaging one side of said diaphragm; a tubular housing extending centrally from said cap; adjustable means disposed in said housing for resiliently urging said backing plate and diaphragm in one direction; a closure secured to and extending beyond the outer end of said housing; a valve controlling the flow of fluid through each inlet opening, each of said valves having a stem engaging the other side of said diaphragm; a valve-operating element aligned with each valve stem and extending through said diaphragm backing plate and said cap adjacent the external periphery of said housing and engaging the side of said diaphragm opposite to that engaged by said stems; means urging each of said valves to a closed position; means for selectively maintaining one of said valves in an open position, said means comprising a cylindrical cam engaging said housing between said closure and said cap; said cylindrical cam having a diagonal inner end in continuous engagement with an end of each of said valve-operating elements; and means on said cam for engagement with a suitable operating tool whereby said cam may be rotated to selectively depress said valve-operating elements.

HERMAN W. CARNES.